United States Patent
Juarez Espinoza et al.

(10) Patent No.: US 10,822,850 B1
(45) Date of Patent: Nov. 3, 2020

(54) CANTILEVERED FLAPPER DOOR ASSEMBLY FOR A VEHICLE

(71) Applicant: Ford Global Technologies, LLC, Dearborn, MI (US)

(72) Inventors: Jose Nicolas Juarez Espinoza, Cuajimalpa de morelos (MX); Diego Fabricio Villacres Mesias, Toluca (MX); Eric Bryan Arellano Aguilar, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 16/445,584

(22) Filed: Jun. 19, 2019

(51) Int. Cl.
*B60J 5/10* (2006.01)
*E05D 7/00* (2006.01)
*E05D 5/02* (2006.01)
*E05D 5/04* (2006.01)

(52) U.S. Cl.
CPC .......... *E05D 5/0207* (2013.01); *B60J 5/107* (2013.01); *E05D 5/043* (2013.01); *E05Y 2900/546* (2013.01)

(58) Field of Classification Search
CPC .............. B60J 5/107; E05Y 2900/546; E05Y 2900/548; E05D 5/0207
USPC ................... 296/146.8, 76, 106; 292/341.14
See application file for complete search history.

(56) References Cited

U.S. PATENT DOCUMENTS

| | | | | |
|---|---|---|---|---|
| 309,238 | A * | 12/1884 | Mix ................... | E05B 15/0205 292/341.14 |
| 518,405 | A * | 4/1894 | Heymanson ........ | E05B 15/0205 292/341.14 |
| 2,467,815 | A * | 4/1949 | Curtiss, Jr. ............ | E05B 15/029 200/61.68 |
| 3,458,227 | A * | 7/1969 | Knox ................... | E05B 15/029 292/341.14 |
| 7,758,097 | B2 * | 7/2010 | Dilley ................... | E05B 15/029 296/76 |
| 8,246,088 | B2 * | 8/2012 | Stechschulte ......... | E05B 85/045 292/341.14 |
| 8,469,440 | B2 * | 6/2013 | Thorpe .................. | E05B 77/36 296/146.9 |
| 8,998,278 | B2 | 4/2015 | Wilde et al. | |
| 9,309,693 | B2 * | 4/2016 | Puscas ................... | E05B 85/00 |
| 9,556,648 | B2 | 1/2017 | Gardner et al. | |
| 2013/0031844 | A1 * | 2/2013 | Quinn ................... | E05B 85/045 49/503 |
| 2013/0038075 | A1 * | 2/2013 | Wilde .................... | E05B 81/00 292/341.14 |

(Continued)

FOREIGN PATENT DOCUMENTS

RU 2663101 C1 8/2018
WO 2016035552 A1 3/2016

*Primary Examiner* — Dennis H Pedder
(74) *Attorney, Agent, or Firm* — David Coppiellie; Price Heneveld LLP

(57) ABSTRACT

A flapper door assembly for a vehicle is provided. The assembly includes a base comprising attachment features and a flapper door connected to the base via the attachment features and a first pivot axis to allow the door to rotate between open and closed positions, wherein the flapper door further comprises at least one cantilever spring integrally formed with the flapper door, wherein the cantilever spring comprises a beam and a second pivot axis offset from the first rod to bias the flapper door to the closed position.

19 Claims, 6 Drawing Sheets

(56) References Cited

U.S. PATENT DOCUMENTS

2015/0233144 A1* 8/2015 Puscas .................. E05B 15/029
  292/341.14
2017/0081875 A1 3/2017 Gardner et al.

* cited by examiner

US 10,822,850 B1

CANTILEVERED FLAPPER DOOR ASSEMBLY FOR A VEHICLE

FIELD OF THE INVENTION

The present invention generally relates to a component for a vehicle latch assembly, and more particularly relates to a retractable door for at least partially covering a region of a door latching component on the vehicle.

BACKGROUND OF THE INVENTION

Automotive vehicles typically employ various latches which operatively engage a striker to close a door member relative to the vehicle body. For example, a car typically has a trunk door with a latch that engages a striker on the door sill at the rear of the vehicle body. Similarly, a hatchback or SUV vehicle has a liftgate door with a latch that engages a striker within the opening on the rear trunk scuff plate. The striker may be exposed when the trunk or liftgate door is in the open position. A retractable door may cover the striker on some vehicles.

SUMMARY OF THE INVENTION

According to one aspect of the present invention, a flapper door assembly for a vehicle is provided. The flapper door assembly includes a base, and a flapper door connected to the base and comprising a first pivot axis to allow a flap of the door to rotate between open and closed positions, wherein the flapper door further comprises at least one cantilever spring integrally formed with the flapper door, wherein the cantilever spring comprises a beam and a second pivot axis offset from the first pivot axis and connected to the base to bias the flapper door to the closed position.

Embodiments of the first aspect of the invention can include any one or a combination of the following features:
  the first pivot axis is provided by first and second pivot rod portions attached to a plurality of connectors on the base and the second pivot axis is provided by a second rod portion of the beam attached to one of the attachment features;
  the plurality of connectors comprises a first connector for receiving the first pivot rod portion a second connector for receiving a second pivot rod portion and the second rod;
  the flapper door assembly further includes a stop member for holding the flapper door in the closed position;
  the second pivot axis is parallel to the first pivot axis;
  the beam is perpendicular to the second pivot axis;
  the flapper door at least partially covers a recess containing a latching component of a vehicle latch assembly for a vehicle door;
  the latching component comprises a striker;
  the vehicle door comprises a trunk door;
  the at least one cantilever spring comprises a first cantilever spring and a second cantilever spring; and
  the first and second cantilever springs are located on opposite sides of the flap of the flapper door.

According to a second aspect of the present invention, a flapper door assembly for a vehicle is provided. The flapper door assembly includes a base comprising attachment features, and a flapper door comprising first rod portions connected to the attachment features to allow a flap of the door to rotate about a first pivot axis between open and closed positions, wherein the flapper door further comprises at least one cantilever spring integrally formed with the flapper door, wherein the cantilever spring comprises a beam and a rod portion connected to one of the attachment features to pivot about a second pivot axis parallel to and offset from the first pivot axis to bias the flapper door to the closed position.

Embodiments of the second aspect of the invention can include any one or a combination of the following features:
  The flapper door assembly further includes a stop member for holding the flapper door in the closed position;
  one of the attachment features comprise a C-shaped arm;
  the flapper door at least partially covers a recess containing a latching component of a vehicle latch assembly for a vehicle door;
  the latching component comprises a striker;
  the vehicle door comprises a trunk door;
  the at least one cantilever spring comprises a first cantilever spring and a second cantilever spring; and
  the first and second cantilever springs are located on opposite sides of the flap of the flapper door.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
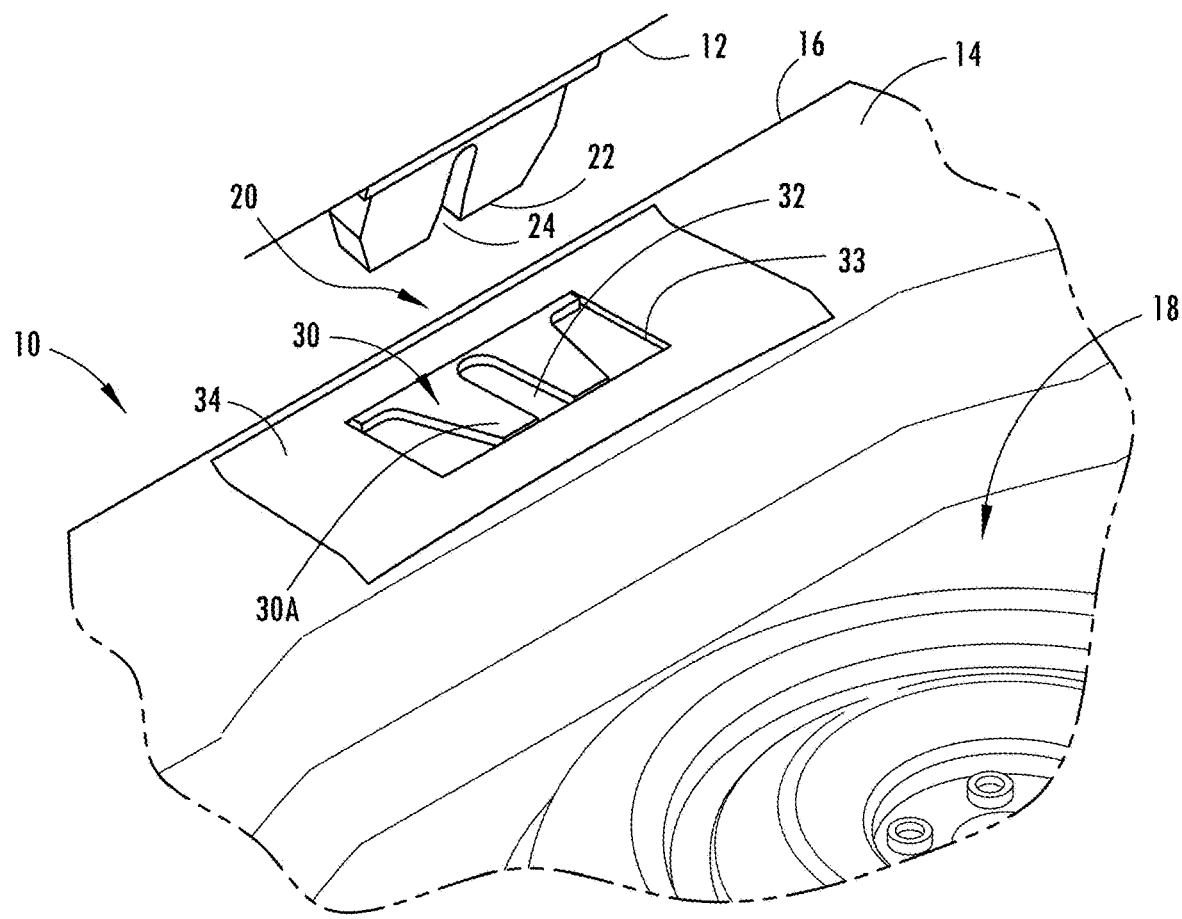
FIG. 1 is a perspective top view of a vehicle trunk having a flapper door assembly with a flapper door shown in a closed position partially covering a recess containing a striker latching component, according to one embodiment.
Figure 2:
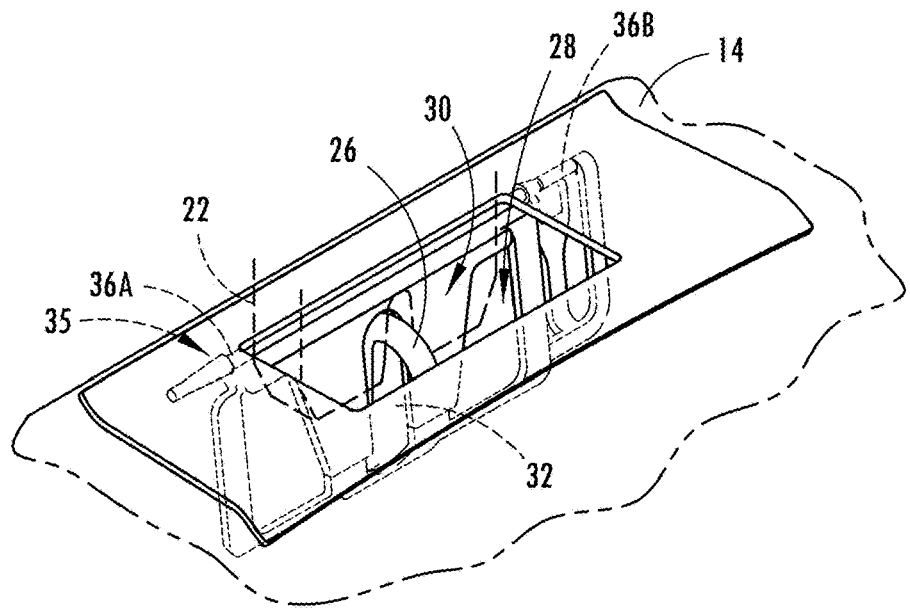
FIG. 2 is an enlarged top perspective view of the flapper door assembly showing the door in an open position exposing the striker latching component to a door latch.
Figure 3:
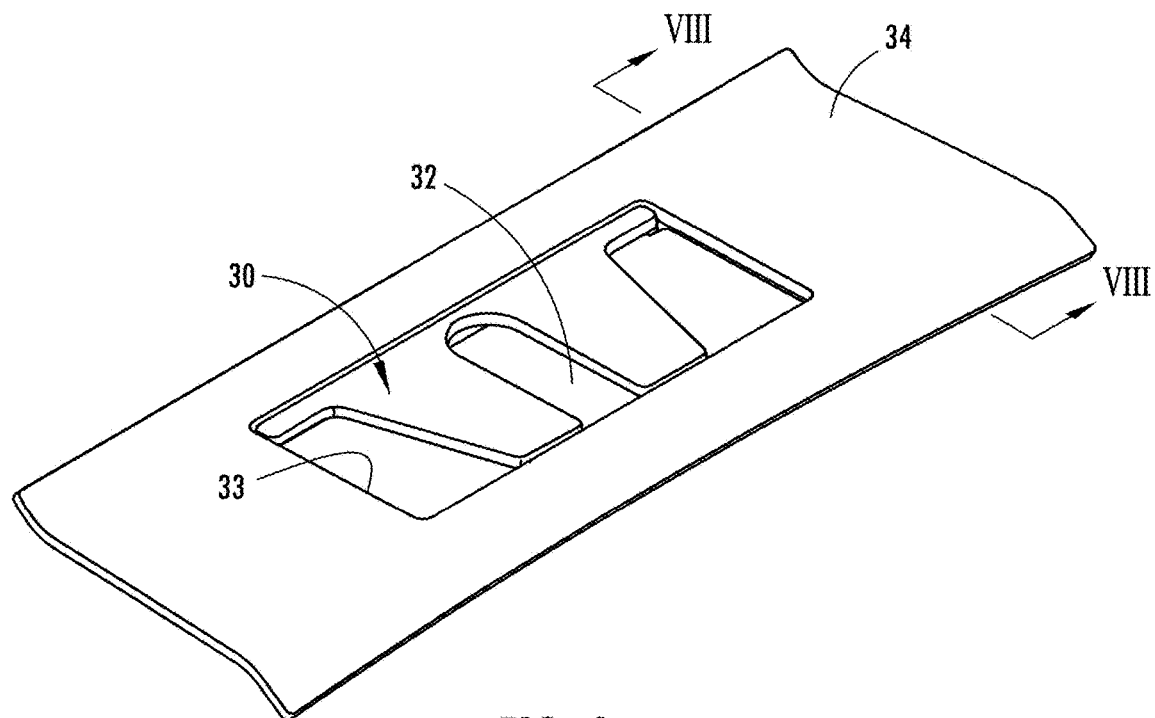
FIG. 3 is a top perspective view of the flapper door assembly.
Figure 4:
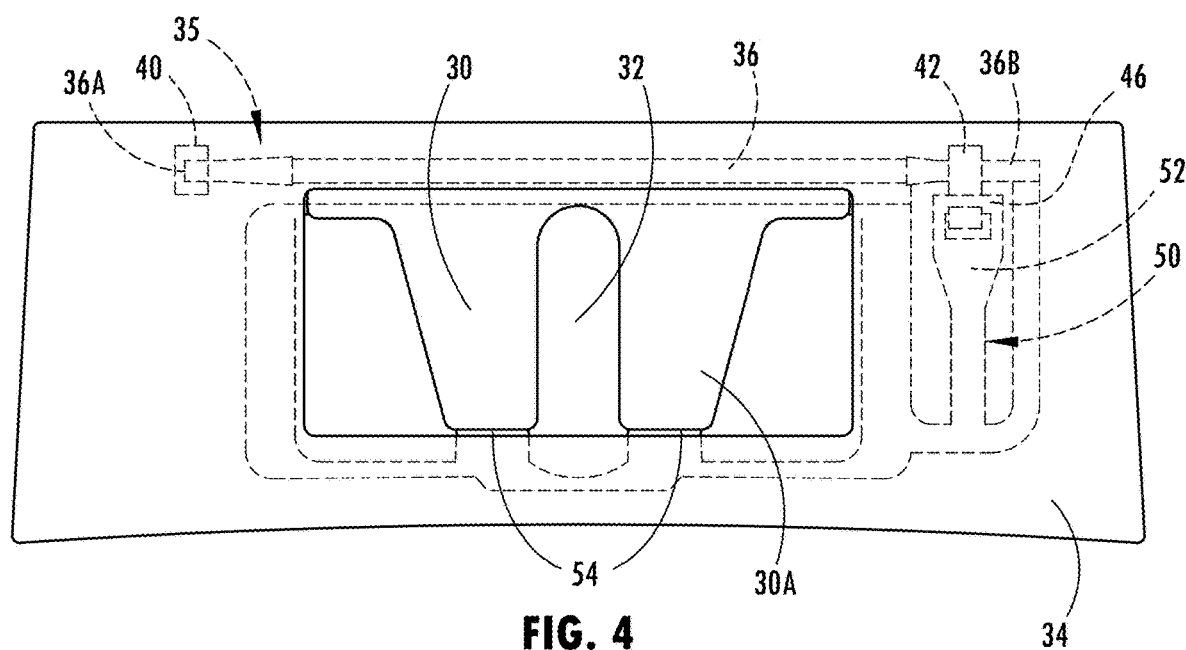
FIG. 4 is a top view of the flapper door assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, the rear portion of a wheeled automotive vehicle 10 is generally illustrated having a trunk storage compartment 18 provided in the body portion at the rear end 16 of the vehicle 10. The vehicle 10 includes a trunk door 12 which is generally hingedly connected to the vehicle body typically on a trunk door sill 14 as is generally known in the art. The trunk door 12 has a latch assembly 20 to latch and hold closed the trunk door 12 to the vehicle body. The latch assembly 20 generally includes a latch housing 22 and a latch 24 shown disposed within the housing 22 and assembled to the trunk door 12. The latch assembly 20 includes a striker 26 located on the trunk door sill 14 of the vehicle body. The latch 24 and striker 26 are latching components that serve as a door catch to latch the trunk door 12 in the closed position. The latch assembly 20 operates by the latch 24 lockingly engaging the striker 26 to latch the door 12 closed against the trunk door sill 14. The latch 24 is releasable to an unlatched position to release engagement with the striker 26 to allow the trunk door 12 to release and pivot upward to an open position, thereby allowing access to the trunk storage compartment 18.

The vehicle 10 includes a retractable flapper door assembly 30 having a flapper door 30A positioned on the trunk door sill 14 to at least partially cover a recessed area 28 containing one of the latching components, such as the striker 26 or latch 24, when the door 12 is in an open position. The flapper door 30A is movable to expose the one of the striker 26 and latch 24 for engagement with the other of the striker 26 and latch 24 when the trunk door 12 closes. In the embodiment shown, the flapper door assembly 30 partially covers the recess 28 containing the striker 26. Thus, the at least partial covering of the striker 26 provides an aesthetically pleasing appearance and prevents objects from contacting or catching the striker 26. It should be appreciated that the flapper door assembly 30 may cover more or less area of the recess 28 generally above the striker 26 according to other embodiments.

The retractable flapper door assembly 30 includes the retractable flapper door 30A shown made up of a pivoting drop door that rotates as a flap about a hinge assembly 35 on one side of the flapper door 30A, according to one embodiment. The base 34 has an open window or opening 33 that covers the outer peripheral portions of the flapper door 30A. The flapper door assembly 30 also includes a base 34 which may be in the form of a trunk scuff plate, according to one embodiment. The base 34 is mounted onto a vehicle support structure for supporting the base 34 relative to the striker recess 28. The base 34 is connected to the flapper door 30A such that the flapper door 30A is in a position to cover at least a portion of the area containing one of the vehicle door latch 24 and striker 26. The support structure is shown including walls formed within door sill 14 which generally define the striker recess 28 which is the recessed space containing the striker 26. The striker 26 is assembled within the recess 28 such that the flapper door 30A may extend over the top of the recess 28 above the striker 26 to cover at least a portion of the recess 28 containing the striker 26 when the trunk door 12 is open.

The hinge assembly 35 is shown connected to the flapper door 30A to allow the flapper door 30A to pivot between the closed position extending over recess 28 and the open position exposing recess 28. In the embodiment shown, the hinge assembly 35 has a first pivot axis 60 that may be defined by a first rod 36 integrally formed along one side of the flapper door 30A that pivots about first and second cylindrical pivot rod portions 36A and 36B such that flapper door 30A opens from a substantially horizontal arrangement to drop-down on the vehicle forward side to a substantially perpendicular vertical arrangement to expose the striker 26. The flapper door assembly 30 includes at least one cantilever spring 50 having a beam 52 and a second pivot axis 62 defined by a second rod 46 that biases the flapper door 30A to the closed position as shown in FIG. 5.

Figure 5:
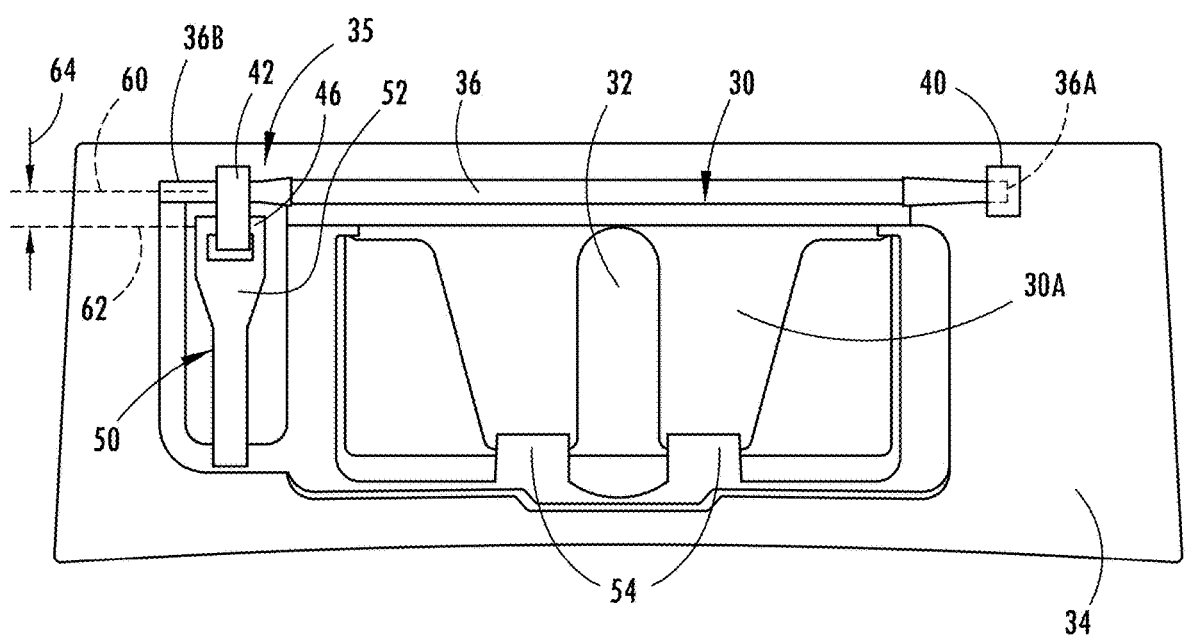
FIG. 5 is a bottom view of the flapper door assembly having a first cantilever spring, according to one embodiment.
Figure 6:
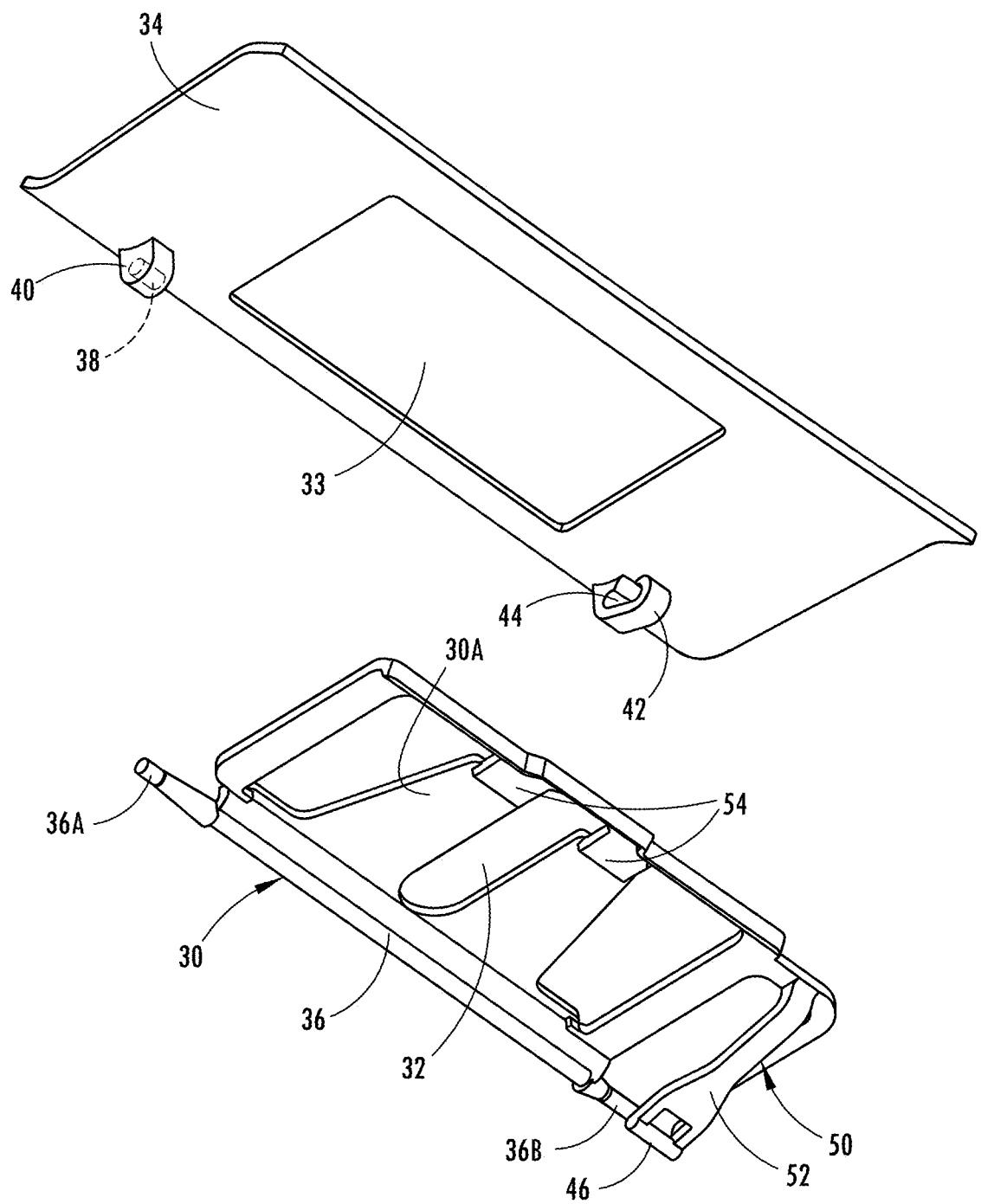
FIG. 6 is an exploded bottom view of the flapper door assembly shown in FIG. 5.
Figure 7:
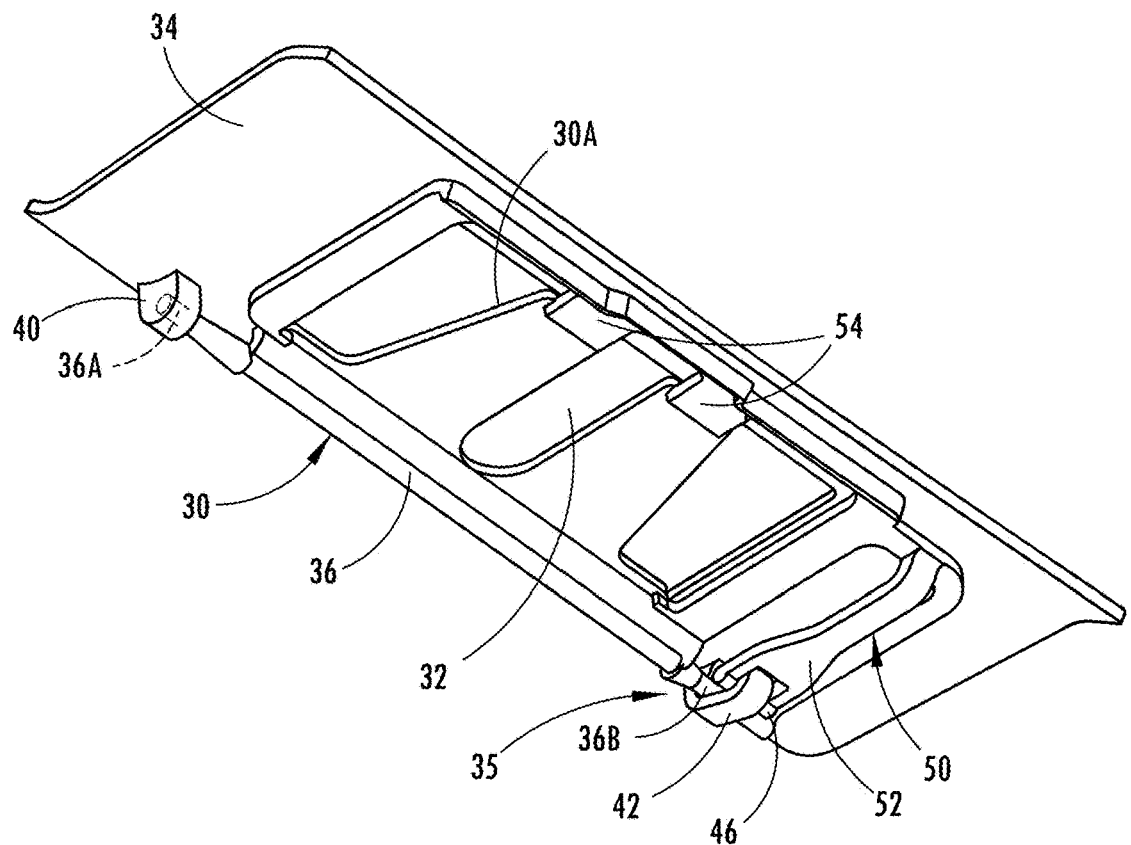
FIG. 7 is a bottom perspective view of the flapper door assembly shown in FIG. 5.

In the embodiment shown in FIGS. 1-9, the retractable flapper door assembly 30 is actuated to the open position due to contact force applied by the latch housing 22 when the trunk door 12 is moved downward to the closed position. In doing so, housing 22 contacts the top surface of the flapper door 30A and forces the flapper door 30A to pivot downward from the closed position shown in FIG. 1 to the open position shown in FIG. 2, so as to expose the striker 26 which extends through an opening or open window 32 in the flapper door 30A to allow latching connection of the latch 24 to the striker 26. In doing so, the cantilever spring 50 is cantilevered with a spring bias force when the flapper door 30A is in the open position. When the latch 24 is disengaged or unlocked from the striker 26, the trunk door 12 may move upward and away from flapper door 30A such that the biased cantilever spring 50 forces the flapper door 30A back to the closed position as shown in FIGS. 1 and 5 in which the recess 28 containing the striker 26 is at least partially covered.

Referring to FIG. 5, the flapper door assembly 30 is illustrated having a single cantilever spring 50 provided on one side of the flapper door 30A, according to a first embodiment. The flapper door assembly 30 includes the base 34 generally extending around the striker recess 28 and above the flapper panel 30A and having a central opening 33. The base 34 has attachment features including a first connector 40 and the second connector 42. The first connector 40 receives a first terminal end of the first pivot rod portion 36A. The second connector 42 receives the second pivot rod portion 36B. Connectors 40 and 42 allow the first and second pivot rod portions 36A and 36B to pivot or rotate about the first pivot axis 60 to move the flapper door 30A between the open and closed positions. The first connector 40 may include a blind hole having a size configured to receive a shape of the first pivot rod portion 36A. The second connector 42 may include a larger opening that receives the second pivot rod portion 36B proximate the second end and further connects to the second rod 46 at the one end of beam 52 of the cantilever spring 50. In the embodiment shown in FIGS. 5-9, the second connector 42 may include a C or J-shaped connector having one or more spaces 44 for receiving the second pivot rod portion 36B and the second rod 46. The first and second pivot rod portions 36A and 36B define the first pivot axis 60 of the flapper door 30A. The second rod 46 defines the second pivot axis 62 of the beam 52 and is offset from the first pivot axis 60. The offset is shown by offset distance 64. As such, the offset arrangement of the second pivot axis 62 of the cantilever spring 50 relative to the first pivot axis 60 provides a bias force to the flapper door 30A when in the closed position.

The flapper door assembly 30 may further include a pair of mechanical end stop members 54 integrally formed therein and positioned so as to stop and hold the flapper door 30A in the closed position that is substantially horizontal. The end stop members 54 may include extended pieces of material that are integrally formed with the flapper door assembly 30. As the cantilever spring 50 biases the flapper door 30A towards the closed position, the end stop members 54 may provide end limits of travel to the flapper door 30A.

The flapper door 30A is integrally formed to include the first and second cylindrical pivot rod portions 36A and 36B on one side, e.g., the vehicle rearward side, and the cantilever spring 50 that integrally connects onto the opposite side, e.g., the vehicle forward side. The cylindrical pivot rod portions 36A and 36B are coincident with the rotational first pivot axis 60 of the flapper door 30A and attaches to the first and second connectors 40 and 42 that are formed or molded into the base 34 which is shown as a trunk scuff plate.

The cantilever spring 50 has a cantilever beam 52 oriented normal or perpendicular to the first pivot axis 60 of the cylindrical pivot rod portions 36A and 36B. A fixed end of the cantilever beam 52 is on the end farthest from the rotational axis of the cylindrical pivot rod portions 36A and 36B while a flexing end of the beam 52 has the second rod 46 formed therewith that is closer to the rotational axis of the first pivot rod portions 36A and 36B. The pivot rod portions 36A and 36B are aligned to the rotational axis 60 of the flapper door 30A and act as a first anchorage point of the flapper door 30A. The second rod 46 is offset from the first pivot axis 60 and is parallel to the first pivot axis 60 and acts as a second anchorage point. This connection restricts movement of the flexing end of the cantilever beam 52, and concentrates effort at the joint between the cantilever beam 52 and gate and generates a spring-back force as a consequence of the tensile modulus of the material. The cantilever beam 52 is thus biased under tension to bear the flapper door 30A towards the closed position.

The cantilever beam 52 is generally parallel to a plane of the flapper door 30A but is not necessarily coplanar as the spring-back force can be tuned by modifying the distance between them. The angle of the cantilever beam 52 can also be modified in order to tune the spring-back force. Thus, the bias force of the cantilever spring 50 is therefore tunable.

It should be appreciated that the flapper door 30A of the flapper door assembly 30 may be integrally formed from a single piece injection molded polymeric material that forms the flapper door 30A, first and second pivot rod portions 36A and 36B, second rod 46, the cantilever spring 50, and the stoppers 54. The first and second pivot rod portions 36A and 36B are then connected to the first and second connectors 40 and 42 of the base 34 and the second rod 46 of cantilever spring 50 connects to connector 42 during the assembly process. It should be appreciated that the flapper door 30A may be easily assembled onto the base 34 either prior to or during assembly onto the vehicle 10.

Figure 8:
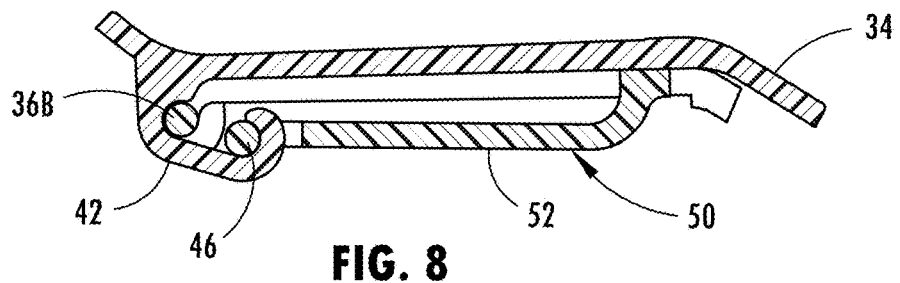
FIG. 8 is a cross-sectional view taken through line VIII-VIII of FIG. 3 with the flapper door shown in the closed position.
Figure 9:
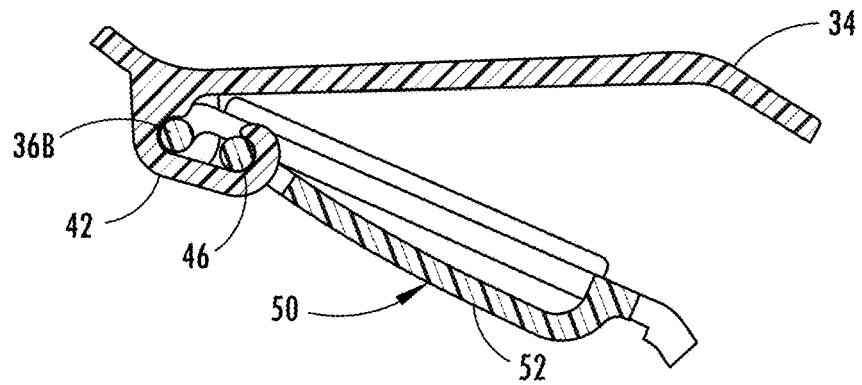
FIG. 9 is a cross-sectional view taken through line VIII-VIII of FIG. 3 with the flapper door shown in the open position.

Referring to FIGS. 8 and 9, the flapper door assembly 30 is generally illustrated in a closed position shown in FIG. 8 in which the flapper door 30A is substantially horizontal to cover a portion of the area of the recess 28 above the striker 26 when the trunk door is in the open position. This provides a surface that may prevent contact with at least a portion of the striker 26 or other surfaces within the recess 28. When the trunk door is lowered to the closed position, the latch housing 22 forcibly depresses the flapper door 30A downward to the pivoted open position shown in FIG. 9 to expose the recess and enable the latch 24 to matingly engage with the striker 26. Upon unlatching and removal of the latch housing 22 from the striker 26, the flapper door 30A is biased by the cantilever spring 50 to pivot back to the closed position.

Figure 10:
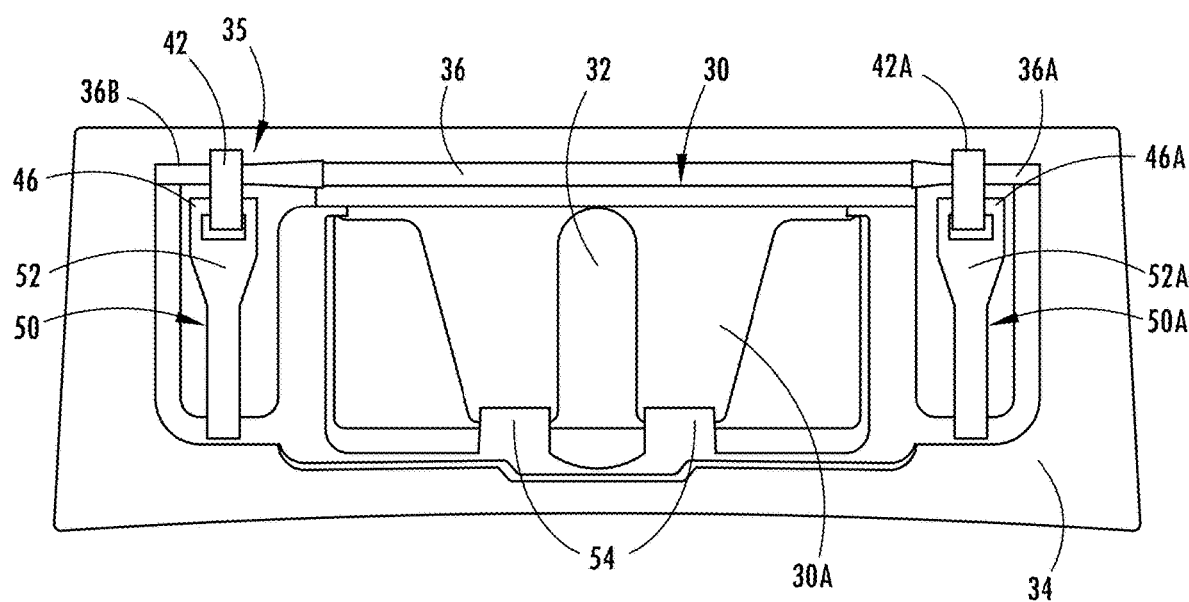
FIG. 10 is a bottom view of a flapper door assembly having first and second cantilever springs, according to another embodiment.

It should be appreciated that the flapper door assembly 30 may employ more than one cantilever spring. Referring to FIG. 10, a flapper door assembly 30 is shown having first and second cantilever springs 50 and 50A located on opposite sides of the flapper door 30A. In this embodiment, the first cantilever spring 50 has a cantilever beam 52 integrally formed with a rod 46 that is connected to a connector 42 which also connects to one end of the second rod portion 36B. The second cantilever spring 50A is also provided having a beam 52A integrally formed with a rod 46A that is connected to a connector 42A which also connects to the first rod portion 36A. Each of the first and second cantilever springs 50 and 50A may be configured similar to the cantilever spring 50 shown and described in connection with the embodiment shown in FIGS. 1-9 and provides a cantilever force to bias the flapper door 30A to the closed position. By employing first and second cantilever springs 50 and 50A on opposite sides of the flapper door 30A, a more balanced bias force is applied to the flapper door 30A. It should be appreciated that the embodiment with the two cantilever springs 50 and 50A may each include the beam and second rod of each cantilever spring connected to a C-shaped connector on the base 34. Each of the first and second cantilever springs 50 and 50A may likewise be tunable by modifying the distance between each of the cantilever springs 50 and 50A and the plane of the flapper door 30A and the angle of the cantilever beams 50 and 50A.

Accordingly, the retractable flapper door assembly 30 advantageously provides an easy to make and assemble door assembly that at least partially covers an area of the striker recess 28 above the striker 26 proximate to the rear end of a vehicle 10 when the trunk door is in the open position. The flapper door assembly 30 may therefore eliminate the need for one or more additional separate components, such as additional springs, and provides for reduced complexity of the assembly and cost savings. Further, the flapper door assembly 30 may be tuned to achieve a desired closing bias force.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A flapper door assembly for a vehicle, comprising:
a base; and
a flapper door connected to the base and comprising a first pivot axis to allow a flap of the door to rotate between open and closed positions, wherein the flapper door further comprises at least one cantilever spring integrally formed with the flapper door, wherein the cantilever spring comprises a beam and a second pivot axis offset from the first pivot axis and connected to the base to bias the flapper door to the closed position.

2. The flapper door assembly of claim 1, wherein the first pivot axis is provided by first and second pivot rod portions attached to a plurality of connectors on the base and the second pivot axis is provided by a second rod portion of the beam attached to one of the connectors.

3. The flapper door assembly of claim 2, wherein the plurality of connectors comprises a first connector for receiving the first pivot rod portion a second connector for receiving a second pivot rod portion and the second rod.

4. The flapper door assembly of claim 1 further comprising a stop member for holding the flapper door in the closed position.

5. The flapper door assembly of claim 1, wherein the second pivot axis is parallel to the first pivot axis.

6. The flapper door assembly of claim 5, wherein the beam is perpendicular to the second pivot axis.

7. The flapper door assembly of claim 1, wherein the flapper door at least partially covers a recess containing a latching component of a vehicle latch assembly for a vehicle door.

8. The flapper door assembly of claim 7, wherein the latching component comprises a striker.

9. The flapper door assembly of claim 8, wherein the vehicle door comprises a trunk door.

10. The flapper door assembly of claim 1, wherein the at least one cantilever spring comprises a first cantilever spring and a second cantilever spring.

11. The flapper door assembly of claim 10, wherein the first and second cantilever springs are located on opposite sides of the flap of the flapper door.

12. A flapper door assembly for a vehicle, comprising:
a base comprising attachment features; and
a flapper door comprising first rod portions connected to the attachment features to allow a flap of the door to rotate about a first pivot axis between open and closed positions, wherein the flapper door further comprises at least one cantilever spring integrally formed with the flapper door, wherein the cantilever spring comprises a beam and a rod portion connected to one of the attachment features to pivot about a second pivot axis parallel to and offset from the first pivot axis to bias the flapper door to the closed position.

13. The flapper door assembly of claim 12 further comprising a stop member for holding the flapper door in the closed position.

14. The flapper door assembly of claim 12, wherein one of the attachment features comprise a C-shaped arm.

15. The flapper door assembly of claim 12, wherein the flapper door at least partially covers a recess containing a latching component of a vehicle latch assembly for a vehicle door.

16. The flapper door assembly of claim 15, wherein the latching component comprises a striker.

17. The flapper door assembly of claim 15, wherein the vehicle door comprises a trunk door.

18. The flapper door assembly of claim 12, wherein the at least one cantilever spring comprises a first cantilever spring and a second cantilever spring.

19. The flapper door assembly of claim 18, wherein the first and second cantilever springs are located on opposite sides of the flap of the flapper door.

* * * * *